E. W. SKIPWORTH.
COMBINATION SKID AND TRUCK.
APPLICATION FILED OCT. 7, 1908.
924,282.
Patented June 8, 1909.
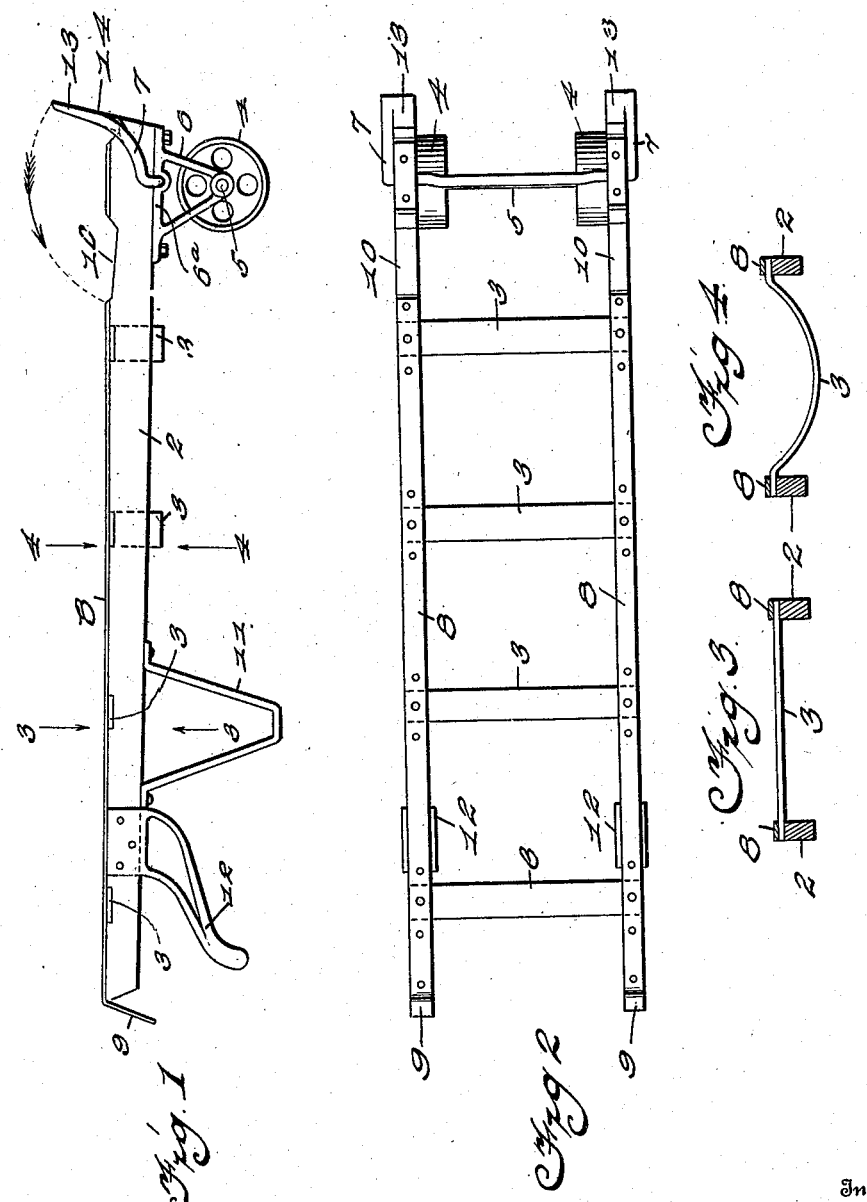

UNITED STATES PATENT OFFICE.

ELMER W. SKIPWORTH, OF CHICAGO, ILLINOIS.

COMBINATION SKID AND TRUCK.

No. 924,282.

Specification of Letters Patent.

Patented June 8, 1909.

Application filed October 7, 1908. Serial No. 456,539.

*To all whom it may concern:*

Be it known that I, ELMER W. SKIPWORTH, citizen of the United States, residing at Chicago, in the county of Cook and State of Illinois, have invented certain new and useful Improvements in Combination Skids and Trucks, of which the following is a specification.

This invention is a combination or convertible skid and truck, and has for its object to provide an improved and serviceable article of the kind, as will more fully appear from the following description and the accompanying drawings.

In the drawings,—Figure 1 is a side view. Fig. 2 is a top or plan view. Fig. 3 is a cross section on line 3—3 of Fig. 1. Fig. 4 is a cross section on line 4—4 of Fig. 1.

Referring specifically to the drawings, the frame of the truck consists of two side pieces 2 with cross bars 3. One end of the frame is supported by two wheels 4 on an axle 5. The axle is carried by a bearing bracket 6 at each end, secured to the lower side of the frame, and the top bar of the bracket at 6ª serves as a bearing or holder for the movable foot piece 7. The top of the frame or pieces 2 is covered by a strip of steel 8 secured to same and one end of the strip is bent to the shape of a hook 9 at the rear end of the truck frame. The strips are interrupted or separated by recesses or spaces 10 on the side pieces. Legs 11 are provided and are bolted to the under side of the frame to the pieces 2 respectively. Handles 12 are also provided for use as a truck. As shown in Figs. 3 and 4 some of the cross bars 3 are straight and others are dished, and thus rectangular or circular objects may be conveniently carried thereon, respectively.

The foot piece 7 consists of a cross rod or bar extending across under the frames 2 and held by the brackets 6, and having forwardly or upwardly projecting toes 13, to insert under a package or bale. When the implement is used as a truck the foot piece is swung up as shown in the drawings. When used as a skid it is swung down as indicated by the dotted line, the toes 13 seating in the recesses 10, with the back or upper side 14 flush with the surface of the straps 8, thereby making a smooth and continuous surface the whole length of the skid. The cross bar of the foot piece 7 is curved or shaped so that it conforms to the line of the adjacent curved cross bar 3, to assist in supporting barrels or other cylindrical objects thereon.

I claim:

1. A skid and truck comprising a pair of side bars, and cross bars forming a frame, with supporting wheels and a swinging foot piece at one end, and hooks and handles at the other end, the handles projecting from the under surface of the side bars.

2. A skid and truck having a pair of side bars with recesses in the upper surface thereof, and a swinging foot piece mounted on said side bars and having upwardly projecting toes which drop into said recesses, flush with the surface of the bars, when the foot piece is swung down to permit the implement to be used as a skid.

3. A skid and truck having side bars with wheel brackets fastened to the under side of the bars, the brackets having top members extending along the bars, and a swinging foot piece pivotally held between said members and the bars and having upwardly projecting toes.

In testimony whereof, I affix my signature in presence of two witnesses.

ELMER W. SKIPWORTH.

Witnesses:
 A. L. PERSONS,
 E. J. CUNNINGHAM.